US010652692B2

(12) United States Patent
Griesbeck et al.

(10) Patent No.: US 10,652,692 B2
(45) Date of Patent: May 12, 2020

(54) METHOD AND DEVICE FOR THE SELECTIVE TRANSMISSION OF DATA

(71) Applicant: Continental Automotive GmbH, Hannover (DE)

(72) Inventors: Martin Griesbeck, Parkstetten (DE); Daniel Wunderlich, Donastauf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/767,831

(22) PCT Filed: Sep. 22, 2016

(86) PCT No.: PCT/EP2016/072593
§ 371 (c)(1),
(2) Date: Apr. 12, 2018

(87) PCT Pub. No.: WO2017/063842
PCT Pub. Date: Apr. 20, 2017

(65) Prior Publication Data
US 2018/0302771 A1  Oct. 18, 2018

(30) Foreign Application Priority Data
Oct. 15, 2015  (DE) .................. 10 2015 220 070

(51) Int. Cl.
*H04W 4/021* (2018.01)
*H04W 4/46* (2018.01)
(Continued)

(52) U.S. Cl.
CPC ............ *H04W 4/021* (2013.01); *G01C 21/34* (2013.01); *G01C 21/3661* (2013.01);
(Continued)

(58) Field of Classification Search
CPC ..... H04W 4/046; H04W 4/027; H04W 4/021; H04W 4/44; H04W 4/024; H04W 4/46
See application file for complete search history.

(56) References Cited

U.S. PATENT DOCUMENTS

| 6,522,875 B1 | 2/2003 | Dowling et al. |
| 2007/0155404 A1 | 7/2007 | Yamane et al. |

(Continued)

FOREIGN PATENT DOCUMENTS

| CN | 102334148 A | 1/2012 |
| CN | 102779421 A | 11/2012 |

(Continued)

OTHER PUBLICATIONS

Office Action dated Jun. 21, 2016 for corresponding German Patent Application No. 10 2015 220070.1.

(Continued)

*Primary Examiner* — Keith Ferguson

(57) ABSTRACT

A method for selectively transmitting data from a transmitter to a receiver in a non-railbound land vehicle comprises, at the receiver end, selecting at least one geographical region. In this case, a geographical region corresponds to a limited area on a map. After the at least one region has been selected, a request is transmitted to the transmitter to transmit data relating to the at least one selected geographical region, and finally a data transmission initiated by the transmitter in response to the request is received. The data relating to the at least one selected geographical region contain, in particular, information relating to a traffic route infrastructure in the geographical region, which information is valid for a limited period or for a longer time.

18 Claims, 3 Drawing Sheets

(51) Int. Cl.
  *G01C 21/34* (2006.01)
  *H04W 4/44* (2018.01)
  *G01C 21/36* (2006.01)
  *H04W 4/024* (2018.01)
  *H04W 4/02* (2018.01)

(52) U.S. Cl.
  CPC .............. *H04W 4/44* (2018.02); *H04W 4/46* (2018.02); *H04W 4/024* (2018.02); *H04W 4/027* (2013.01)

(56) References Cited

U.S. PATENT DOCUMENTS

| | | |
|---|---|---|
| 2010/0321399 A1 | 12/2010 | Ellren et al. |
| 2012/0041669 A1 | 2/2012 | Zaitsu et al. |
| 2013/0304379 A1* | 11/2013 | Fulger ................ G01C 21/3415 701/533 |
| 2014/0058661 A1 | 2/2014 | Choi et al. |
| 2015/0160023 A1 | 6/2015 | Goel et al. |
| 2015/0262182 A1* | 9/2015 | Gervais .................. G06Q 20/10 705/44 |

FOREIGN PATENT DOCUMENTS

| | | |
|---|---|---|
| CN | 103139708 A | 6/2013 |
| CN | 103384260 A | 11/2013 |
| DE | 102013210410 A1 | 12/2013 |
| JP | 2000121371 A | 4/2000 |
| WO | 2012157850 A2 | 11/2012 |

OTHER PUBLICATIONS

International Search Report and Written Opinion dated Dec. 13, 2016 from corresponding International Patent Application No. PCT/EP2016/072593.

* cited by examiner

METHOD AND DEVICE FOR THE SELECTIVE TRANSMISSION OF DATA

BACKGROUND

The present invention relates to a method and an apparatus for selectively transmitting data relating to a geographical region to a receiver in a non-railbound vehicle.

In modern vehicles, in particular non-railbound land vehicles, data are being increasingly processed by external sensors and databases. In this context, the term "external" in connection with sensors and databases relates to those sensors and databases which are not permanently connected to the vehicle or are only temporarily in the latter. Accordingly, these data are referred to as external data below.

The external data are provided by external data sources, for example by other vehicles or by stationary databases. If the external data are provided by other vehicles, the term "car-to-car" or "car-2-car" or variations thereof is frequently used. If external data are provided by stationary databases, the term "car-to-infrastructure" or "car-2-infrastructure" or variations thereof is often used. A stationary database in the context of this description also comprises a combination of a plurality of databases at different locations which is combined to form a single virtual database. The combination can also be dynamically variable, for example on the basis of a changing data volume. In addition, a database in the context of this description can also carry out and provide data-processing functions, for example data analysis, filter functions and the like. The terms "cloud" and "cloud computing" are often used as representative of such databases.

External data transmitted to vehicles may contain information relating to the current traffic on roads in the area surrounding the vehicle or on a planned route or information relating to attractions or other points of interest in the area surrounding the vehicle or along a planned route. It is also possible to transmit general status and state information relating to the traffic route network of a region.

Such data can be transmitted as a broadcast via a broadcasting network, for example, and can be received by every suitable receiving unit. If data are transmitted to a multiplicity of vehicles distributed over a large geographical region, the proportion of data in the total volume of received data that are relevant to a respective vehicle falls. Nevertheless, all data must be initially received and possibly stored.

A necessary process for individually selecting the data relevant to a respective vehicle may require considerable resources during storage and filtering. In addition, the data rate of the transmission must increase with an increasing volume of data if a particular update period is intended to be complied with. In this case, update periods which are as short as possible are desirable from the point of view of the users and can decide on success or failure of a data service.

It may therefore be useful to selectively transmit data relevant to individual vehicles by means of targeted transmissions. This makes it possible to keep the volume of data to be transmitted for each vehicle small. Data which are relevant only to a particular geographical region, for example hazard alerts on a particular road, can therefore be transmitted only to those vehicles which are or will be en route in the relevant region or on the affected road.

Transmission can be carried out, for example, using one of the known mobile radio standards, for example using the Global System for Mobile Communications (GSM), using the Universal Mobile Telecommunications System (UMTS) or using the Long Term Evolution System (LTE). Other wireless communication standards, for example IEEE 802.11, IEEE 802.15.4 or the like, which cover a smaller spatial region than the abovementioned standards can also be used depending on local conditions and the installed infrastructure. For this purpose, it may be necessary to statically connect the individual transmitters to form a larger network or to use a dynamic mesh network structure.

One example of providing data relating to the traffic situation in a particular spatial region is known in connection with the Microsoft™ map application "Bing Maps". The map application "Bing Maps" has a programming interface (Application Programming Interface, API) which can be used to retrieve traffic data relating to a route (Route API) or for a particular geographical area (Traffic API). A vehicle which has a computer connected to the Internet, for example a navigation unit, can individually retrieve and process the required traffic information by means of suitable software.

When individually transmitting such data, the respective vehicle or the respective receiver must be uniquely identifiable and must specify its geographical position more or less accurately. It is therefore possible to create a movement profile of the receiver, which can result in a considerable restriction of privacy in the event of linking to other data which can be assigned to the receiver.

An object of the present invention is therefore to specify a method and an apparatus for selectively transmitting data to a receiver in a vehicle, which method ensures improved safeguarding of privacy in comparison with existing solutions.

BRIEF SUMMARY

This object is achieved by means of the method specified in patent claim 1 and patent claim 9. Further developments and modifications of the method are specified in the dependent patent claims. Apparatuses for carrying out the method are specified in patent claims 10 and 11, and a vehicle equipped with an apparatus according to the invention is specified in patent claim 12.

The method according to the invention for selectively transmitting data from a transmitter to a receiver in a non-railbound land vehicle provides for at least one geographical region to first of all be selected. In this case, a geographical region corresponds to a limited area on a map. It is irrelevant to the invention whether geographical regions are regularly formed, for example in a rectangular, circular or elliptical form, or whether the geographical regions are irregularly formed, as long as the respective regions correspond at the transmitter and receiver ends. The geographical region is preferably a region in which the vehicle is currently situated or in which it will be situated in the future. In the former case, the current position can be determined, for example, using known geo-localization methods, for example using satellite-based localization according to the GPS standard, and the corresponding region can then be determined by means of comparison with corresponding map data. In the latter case, the region can be selected by a route guidance device, or one or more possible regions which will soon probably be driven through by the vehicle are selected, for example by means of statistical analysis methods or the like.

If one or more regions are selected, a request relating to the selected region(s) to transmit data relating to the geographical region(s) is transmitted to a transmitter. In this case, the term "transmitter" is representative of a database or another data source and a corresponding transmitting device.

In this case, it is irrelevant whether the transmitting device and the database or other data source are arranged in spatial proximity to one another or are remote from one another and are connected by means of a suitable data connection. The transmitting device may also be a network of a plurality of transmitters. In any case, the transmitter must be able to receive the requests. For this purpose, the transmitting device itself may be designed for bidirectional data transmission, or the request can be made via a data connection other than that used to transmit data in response to the request. The data comprise, inter alia, information relating to traffic route infrastructure in the geographical region, which information is valid for a limited period, for example up-to-date traffic information, information relating to events and the like. However, the data may also comprise information relating to the traffic route infrastructure, which information is valid for a longer period, or information relating to attractions and the like.

Finally, data transmitted by the transmitter in response to the request are received by the receiver. As explained above for the transmitter, the term "receiver" is representative of a data processing device and a receiving and transmitting device. In the case of the receiver as well, the data processing device and the receiving and transmitting device may be arranged spatially separate from one another inside the vehicle and may be communicatively connected to one another by means of a suitable data connection. In this case, the receiving and transmitting device, as described above for the transmitter, may have a bidirectional design or may transmit and receive via different data connections. It goes without saying that the data are transmitted wirelessly.

In one configuration of the method according to the invention, the receiver transmits, with the request, a unique identification which is used by the transmitter to identify the receiver in order to transmit the requested data to the receiver. In this case, the identification can be permanently assigned to the receiver, but it is also possible for the receiver to select a random identification for each request, which identification is valid only for one request.

In a further development of the configuration described above, the receiver does not transmit requests directly to a transmitter, but rather first of all to an interposed service with an identification respectively valid only for one request, which service randomly interchanges the identifications of a plurality of receivers for the actual request to the transmitter before the request is forwarded to the transmitter. In this case, the interposed service maintains an assignment matrix in which the interchanged identifications are uniquely assigned so that the responses can be passed to the correct receivers. Such an anonymization service is known, for example, by the acronym "TOR" which originally stood for "The Onion Router".

In one configuration of the method according to the invention, the request corresponds to the negotiation of a subscription for data relating to one or more regions. In this configuration, one or more data transmissions are effected to the receiver as soon as new data relating to the region(s) are available in the transmitter. The subscription remains until it is ended by the receiver. Such a subscription is known in the context of so-called cloud-based database systems by the term "publish-subscribe". In this case, provision may be made for a data transmission to be effected only when there is a minimum volume of new data. Provision may also be made for data to be categorized, for example according to urgency, and for data of a higher urgency level to always be transmitted immediately, but for other data to be initially collected. Therefore, information relating to accidents or traffic jams can be transmitted immediately, for example, whereas other data are only collected. The practice of collecting data before transmission may result in a reduction in the data volume, in particular if a fixed protocol overhead arises for each connection.

In one further development of the method according to the invention, the size of the geographical region(s) can be selectively chosen or adjusted at the receiver. In regions which have only a few traffic routes for example, this can be used to increase a number of possible positions of the vehicle and therefore improve the safeguarding of privacy.

In one configuration of the further development described above, the size of the region(s) is automatically selected or adjusted at the receiver. For example, the size can be changed on the basis of a speed of the vehicle. If, for example, the vehicle is traveling at a first, high speed on a freeway, the regions can be selected to be smaller or can be limited to narrower route sections along the freeway. If the speed is then reduced, the regions can be selected to be larger in order to increase the number of possible positions of the vehicle. In this case, the reduction in the speed is considered to be an indication of leaving the freeway, which in turn can be considered to be an indication of approaching the actual destination. If the speed is reduced, the next request for data is then made for an accordingly enlarged region. A temporary reduction in the speed, for example caused by the volume of traffic, can be disregarded if no request is transmitted during this time. The response behavior of the adaptation to the speed may be adjustable. This automatic variation functions even if no route was planned for the journey. If there was a "subscription" for requests for regions, that is to say data are not retrieved for each individual request, the subscription is accordingly changed for larger regions in this configuration.

In the case of a planned route, regions at the start and/or at the end and/or at intermediate destinations of the route can be selected to be larger in order to increase the number of possible starting points or end points of the route and to make it difficult to locate the vehicle which is possible thereby. Other regions along the route can accordingly be selected to be smaller because an item of information to be derived therefrom is highly likely to have less relevance. It is also possible to select the regions to be larger in the vicinity of junctions or intersections of a road or route being traveled on in order to make it difficult to obtain information relating to the route traveled on.

In another configuration of the method according to the invention, the size of the regions is automatically selected depending on the type of road traveled on and/or is preset for different road classes or can be adjusted by the user. In this case, roads can be categorized or classified according to the maximum permissible speeds, for example.

In another configuration of the method according to the invention, data transmissions for a plurality of receivers in the same region are transmitted by multicast. This method can be used, in particular, if these receivers have "subscribed" to data for this region, that is to say the transmission is effected by means of push messages which are not each individually requested. This configuration can be easily implemented in the case of previously stipulated fixed region boundaries, but can also be implemented in the case of region boundaries individually selected for each vehicle. In this case, data are transmitted in intersections from the regions by multicast.

If fixed region boundaries are predetermined, the regions can be identified and selected using unique identifiers which are known at the transmitter and receiver ends, and data relating to said regions can be requested. This makes it possible to simplify communication and data management.

Irrespective of whether fixed or adjustable region boundaries are used, adjacent regions may overlap. This makes it possible to ensure that information is retrieved for each route section traveled on.

In another configuration of the method according to the invention, data types to be transmitted can be selected. As already mentioned further above, data types can be differentiated by dynamic and static data, for example. Dynamic data may comprise information relating to the current traffic, for example, whereas static data contain, for example, information relating to the traffic routes themselves which change only slightly over time. Data types are preferably bundled in layers, with the result that a receiver can request the respective data types via the corresponding layer. In this case, it is possible to mix the requests in individual requests for particular layers with first data types and as subscription requests for particular second layers with second data types. It is also possible to request different region sizes for different layers or data types.

At the transmitter end, the method provides for a request to first of all be received from a receiver, which request is used by the receiver to request the transmitter to transmit data relating to at least one selected geographical region to the receiver. The transmitter initiates a corresponding data transmission to the receiver, possibly after having previously extracted data relating to the at least one geographical region from a database.

BRIEF DESCRIPTION OF THE DRAWINGS

The invention is described below on the basis of the drawing. In the drawing.

DETAILED DESCRIPTION

In the figures, the same or similar elements are provided with the same reference symbols.

Figure 1:
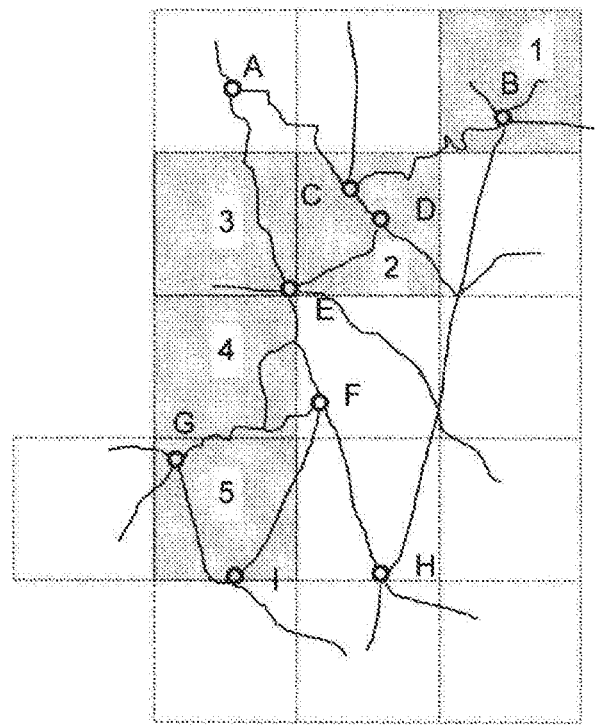
FIG. 1 shows a first schematic illustration of a map having square regions of equal size.

FIG. 1 shows a first schematic illustration of a map having square regions of equal size for illustrating a first configuration of the method according to the invention. Different locations A to I and a plurality of roads connecting individual locations are illustrated on the map. For the description of the first embodiment of the method, it is assumed that a driver is driving his vehicle from the location B to the location G. In this case, the driver would like to receive up-to-date information relating to the traffic situation and the road condition for road sections respectively traveled on during the journey.

If the driver can be guided on the route by a navigation system, the navigation system can determine the regions traversed or touched by the planned route and can send a request to the transmitter to accordingly transmit information relating to these regions in advance or upon approaching a next region to be traversed. In the case of the route shown in the figure, information relating to regions 1 to 5 is therefore retrieved for a route which passes from B to D via C and then via E to G. The reference symbols of the regions are arranged inside the squares in the figure.

If a route has not been precalculated, information can be accordingly respectively retrieved for the region in which the vehicle is currently situated.

Figure 2:
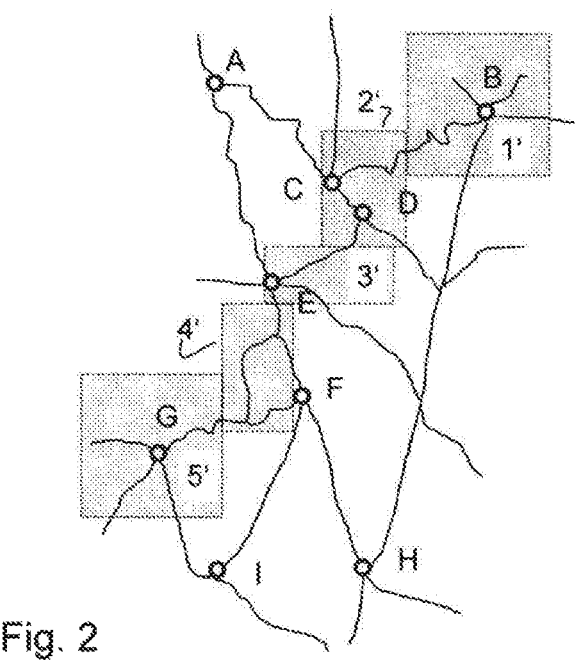
FIG. 2 shows a second schematic illustration of a map having rectangular regions of different size.

FIG. 2 shows a second schematic illustration of the map from FIG. 1 having square regions of different size for illustrating a second configuration of the method according to the invention. In this case, the route traveled by the vehicle is the same as in FIG. 1. In contrast to the method described above, the regions at the start and at the end of the journey, that is to say regions 1' and 5', are selected to be larger here than regions which are only driven through and are selected to be smaller, here regions 2', 3' and 4'. This configuration can be implemented particularly easily in the case of a preplanned route, in which case information relating to regions can be respectively requested in full in advance, possibly supplemented with updated information, or only if required, that is to say when approaching or entering a region.

The use of smaller regions during the journey generally does not mean a considerable deterioration in privacy since a route traveled through in most cases can also be determined when using regions of equal size, whereas a larger region in the destination area considerably increases the number of possible positions. However, the use of smaller regions along the route generally means an advantageous reduction in the data volume to be transmitted and accordingly to be stored and processed.

Figure 3:
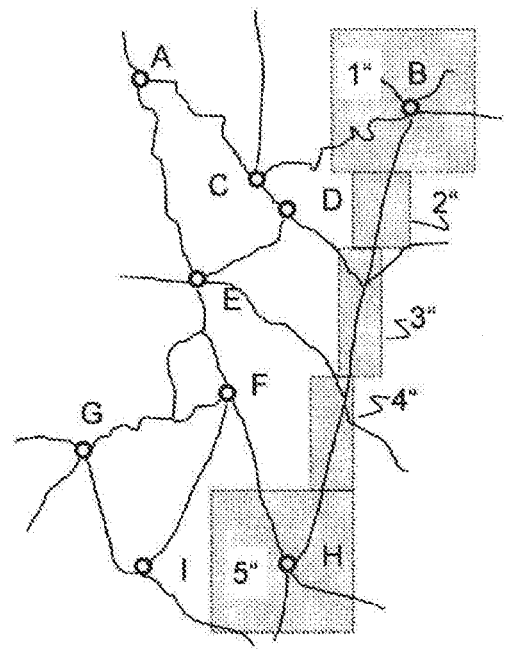
FIG. 3 shows a third schematic illustration of a map having rectangular regions of different size.

FIG. 3 shows a third schematic illustration of the map from FIG. 1 having square regions of different size for illustrating a third configuration of the method according to the invention.

In this case, the route traveled by the vehicle is a different route to that in FIGS. 1 and 2. It shall be assumed here that the driver travels from B to H and that the direct connection between the two locations is a freeway or an expressway. Regions 1" and 5" at the start and end of the route are again larger than along the route, with the same advantages and disadvantages as described in FIG. 2. In this configuration, the size of the regions can be automatically selected, for example on the basis of the speed of the vehicle. Regions 2", 3" and 4" along the freeway or expressway are therefore selected to be smaller because the vehicle moves at high speed here.

Figure 4:
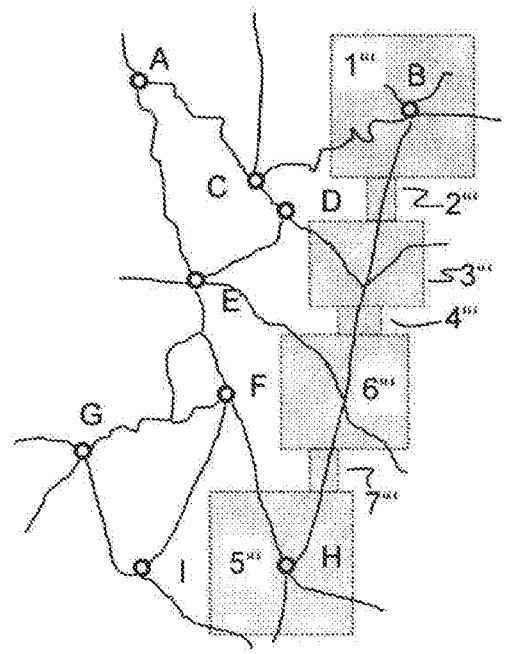
FIG. 4 shows a fourth schematic illustration of a map having rectangular regions of different size.

FIG. 4 shows a fourth schematic illustration of the map from FIG. 1 having square regions of different size for illustrating a fourth configuration of the method according to the invention.

The starting situation is the same as that in FIG. 3, that is to say with larger regions 1''' and 5''' at the start and end of the route and with smaller regions 2''', 4''', 7''' along the route. In this configuration of the method according to the invention, regions 3''' and 6''', which contain junctions or intersections, are additionally selected to be larger than regions without such features. In this case, it is preferably possible to select which junctions or intersections of which category of road are taken into account, that is to say only intersecting freeways or expressways, for example. Therefore, possible positions of the vehicle along the route can be more frequently associated with a lower probability, that is to say can be estimated more poorly by a third party. In addition, a possible destination may be identifiable only later for a third party evaluating requests for regions.

Figure 5:
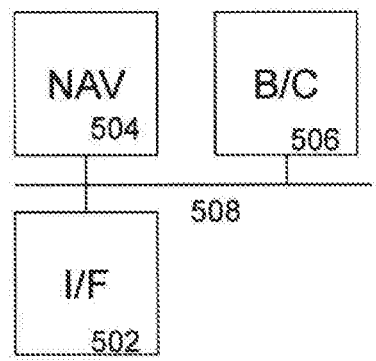
FIG. 5 shows a schematic illustration of a receiver-end apparatus for carrying out the method according to the invention.

FIG. 5 shows a schematic illustration of a receiver-end apparatus 500 for carrying out the receiver-end part of the method according to the invention. The apparatus 500 comprises a wireless interface 502, a route guidance apparatus 504 and an on-board computer 506 which are communicatively connected to one another by means of one or more bus systems 508. The route guidance apparatus 504 is set up to determine a current position of a vehicle (not shown) in which the receiver-end apparatus 500 is installed or is temporarily situated, or to determine a route between two locations. The route guidance apparatus 504 is also set up to select regions on a map according to one or more of the configurations of the method according to the invention described above and to transmit a request, via the interface 502, to a transmitter-end apparatus (not shown) to transmit data relating to selected regions. In this case, the route guidance device 504 can optionally additionally use information from the on-board computer 506 when selecting regions, for example a current speed, a change in the travel direction indicated by a travel direction signal, a recommended detour determined by means of object recognition from a camera image or the like.

Individual components or a plurality of the components of the receiver-end apparatus 500 may also have, in addition to a power supply and a user interface, microprocessors and a volatile and/or non-volatile memory in which program code and data are stored and/or executed (not shown). The program code which is executed causes one or more configurations or further developments of the above-described receiver-end part of the method according to the invention to be carried out.

Figure 6:
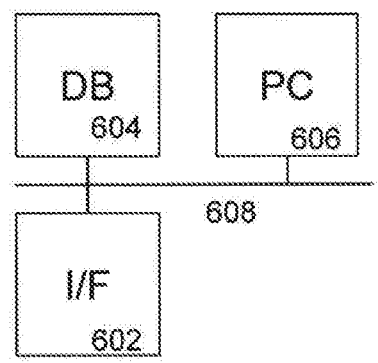
FIG. 6 shows a schematic illustration of a transmitter-end apparatus for carrying out the method according to the invention.

FIG. 6 shows a schematic illustration of a transmitter-end apparatus 600 for carrying out the transmitter-end part of the method according to the invention. The apparatus 600 comprises a wireless interface 602, a database 604 and a computer 606 which are communicatively connected to one another by means of one or more bus systems 608. The apparatus 600 is designed to receive, via the interface 602, requests relating to the transmission of data relating to one or more regions on a map. The data are read from a database 604 by a computer 606 and are transmitted to respective receivers via the interface 602.

Individual components or a plurality of the components of the transmitter-end apparatus 600 may also have, in addition to a power supply and a user interface, microprocessors and a volatile and/or non-volatile memory in which program code and data are stored and/or executed (not shown). The program code which is executed causes the above-described transmitter-end part of the method according to the invention to be carried out.

In this case, the interfaces 502 and 602 may also comprise a combination of different types of wireless interfaces, in which case requests and corresponding responses can be received and transmitted using different types of interfaces.

As a result of the request relating to information for a region on a map rather than for an exact position or route, it is not possible for third parties to determine a position of a vehicle with a high degree of accuracy using data solely obtained from analyzing the request.

The invention claimed is:

1. A method for selectively transmitting data from a transmitter to a receiver in a non-railbound land vehicle, wherein the method at the receiver end comprises:

selecting at least one geographical region, wherein a geographical region corresponds to a limited area on a map, transmitting a request to the transmitter to transmit data relating to the at least one selected geographical region, receiving a data transmission initiated by the transmitter in response to the request, characterized in that a size of the limited area which corresponds to a geographical region and for which data are transmitted is adjustable, is automatically varied on the basis of a speed of the land vehicle, and/or is variable along a planned route, wherein regions at the start and end of a route, at planned intermediate stops or at intersections along the route are larger than on sections of the route which are driven through without stopping.

2. The method as claimed in claim 1, characterized in that the receiver transmits, in the request to the transmitter, a unique identification which is used by the transmitter to identify the receiver in order to transmit the requested data to the receiver.

3. The method as claimed in claim 1, characterized in that the transmission of the request corresponds to the negotiation of a data subscription for the selected geographical region, and in that the receiving comprises receiving one or more data transmissions addressed to the identification of the receiver, which is carried out periodically or in an event-controlled manner until the subscription is ended by the receiver.

4. The method as claimed in claim 1, characterized in that the at least one geographical region is selected in such a manner that it includes a current position of the land vehicle.

5. The method as claimed in claim 1, characterized in that the at least one geographical region is selected in such a manner that it includes planned future positions of the land vehicle.

6. The method as claimed in claim 1, characterized in that the request from the receiver to the transmitter and the data transmission from the transmitter to the receiver are effected using at least one wireless interface.

7. The method as claimed in claim 1, characterized in that geographical regions are predetermined or predefined, in that the predetermined or predefined regions can be identified at the transmitter end and at the receiver end by means of unique identifiers, and in that the at least one region is identified by the identifier in the request from the receiver and/or in the data transmission by the transmitter.

8. The method as claimed in claim 1, characterized in that the data relating to the at least one selected geographical region contain information relating to a traffic route infrastructure in the geographical region, which information is valid for a limited period.

9. The method as claimed in claim 8, characterized in that the receiver transmits, in the request to the transmitter, a unique identification which is used by the transmitter to identify the receiver in order to transmit the requested data to the receiver.

10. The method as claimed in claim 8, characterized in that the transmission of the request corresponds to the negotiation of a data subscription for the selected geographical region, and in that the receiving comprises receiving one or more data transmissions addressed to the identification of the receiver (500), which is carried out periodically or in an event-controlled manner until the subscription is ended by the receiver (500).

11. The method as claimed in claim 8, characterized in that the at least one geographical region is selected in such a manner that it includes a current position of the land vehicle.

12. The method as claimed in claim 8, characterized in that the at least one geographical region is selected in such a manner that it includes planned future positions of the land vehicle.

13. The method as claimed in claim 8, characterized in that the request from the receiver to the transmitter and the data transmission from the transmitter to the receiver are effected using at least one wireless interface.

14. The method as claimed in claim 8, characterized in that geographical regions are predetermined or predefined, in that the predetermined or predefined regions can be identified at the transmitter end and at the receiver end by means of unique identifiers, and in that the at least one region is identified by the identifier in the request from the receiver and/or in the data transmission by the transmitter.

15. A method for selectively transmitting data from a transmitter to a receiver in a non-railbound land vehicle, wherein the method at the transmitter end comprises:
   receiving a request from the receiver to transmit data relating to at least one selected geographical region to the receiver, wherein a geographical region corresponds to a limited area on a map,
   extracting data relating to the at least one geographical region from a database,
   initiating a data transmission to the receiver
   in response to the request, wherein a size of the limited area which corresponds to a geographical region and for which data are transmitted is adjustable, is automatically varied on the basis of a speed of the land vehicle, and/or is variable along a planned route, wherein regions at the start and end of a route, at planned intermediate stops or at intersections along the route are larger than on sections of the route which are driven through without stopping.

16. A transmitter-end apparatus having at least one wireless interface, a computer and a database which are communicatively connected to one another by means of one or more bus systems, characterized in that the computer stores program instructions which, when executed by the computer, carry out a method for selectively transmitting data from a transmitter to a receiver in a non-railbound land vehicle, wherein the method at the transmitter end comprises:
   receiving a request from the receiver to transmit data relating to at least one selected geographical region to the receiver, wherein a geographical region corresponds to a limited area on a map,
   extracting data relating to the at least one geographical region from a database,
   initiating a data transmission to the receiver in response to the request, wherein a size of the limited area which corresponds to a geographical region and for which data are transmitted is adjustable, is automatically varied on the basis of a speed of the land vehicle, and/or is variable along a planned route, wherein regions at the start and end of a route, at planned intermediate stops or at intersections along the route are larger than on sections of the route which are driven through without stopping.

17. A receiver-end apparatus having at least one wireless interface, a computer and a device for determining a current position on the earth's surface which are communicatively connected to one another by means of one or more bus systems, characterized in that the device for determining a current position on the earth's surface or the computer stores program instructions which, when executed by the device for determining a current position on the earth's surface or the computer, carry out a method for selectively transmitting data from a transmitter to a receiver in a non-railbound land vehicle, wherein the method at the receiver end comprises:
   selecting at least one geographical region,
   wherein a geographical region corresponds to a limited area on a map,
   transmitting a request to the transmitter to transmit data relating to the at least one selected geographical region,
   receiving a data transmission initiated by the transmitter in response to the request,
   characterized in that a size of the limited area which corresponds to a geographical region and for which data are transmitted is adjustable, is automatically varied on the basis of a speed of the land vehicle, and/or is variable along a planned route, wherein regions at the start and end of a route, at planned intermediate stops or at intersections along the route are larger than on sections of the route which are driven through without stopping.

18. A non-railbound land vehicle having a receiver-end apparatus having at least one wireless interface, a computer and a device for determining a current position on the earth's surface which are communicatively connected to one another by means of one or more bus systems, characterized in that the device for determining a current position on the earth's surface or the computer stores program instructions which, when executed by the device for determining a current position on the earth's surface or the computer, carry out a method for selectively transmitting data from a transmitter to a receiver in the non-railbound land vehicle, wherein the method at the receiver end comprises:
   selecting at least one geographical region,
   wherein a geographical region corresponds to a limited area on a map,
   transmitting a request to the transmitter to transmit data relating to the at least one selected geographical region,
   receiving a data transmission initiated by the transmitter in response to the request,
   characterized in that a size of the limited area which corresponds to a geographical region and for which data are transmitted is adjustable, is automatically varied on the basis of a speed of the land vehicle, and/or is variable along a planned route, wherein regions at the start and end of a route, at planned intermediate stops or at intersections along the route are larger than on sections of the route which are driven through without stopping.

* * * * *